Sept. 5, 1961
C. A. BRAZIL
2,998,982
TRAILER HITCH SAFETY DEVICE
Filed May 31, 1960
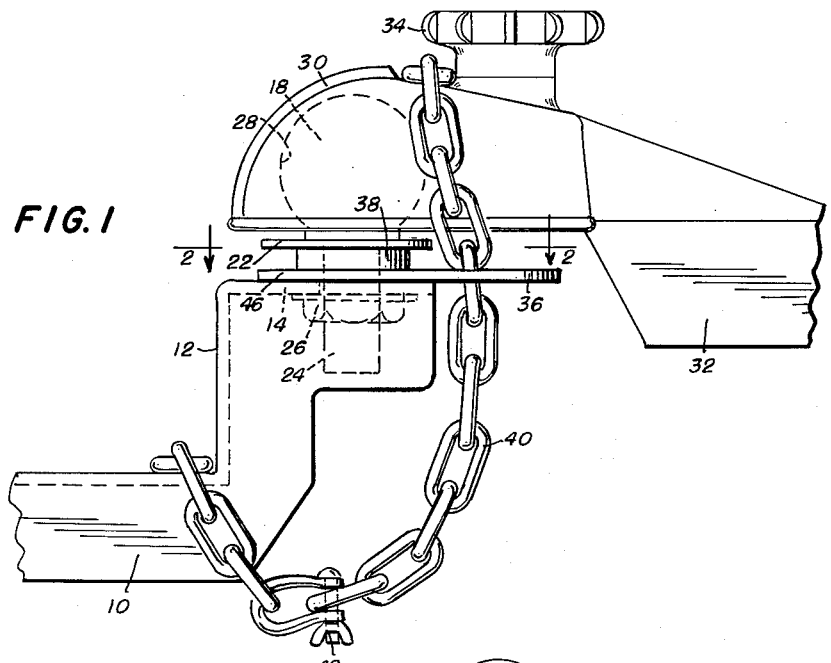
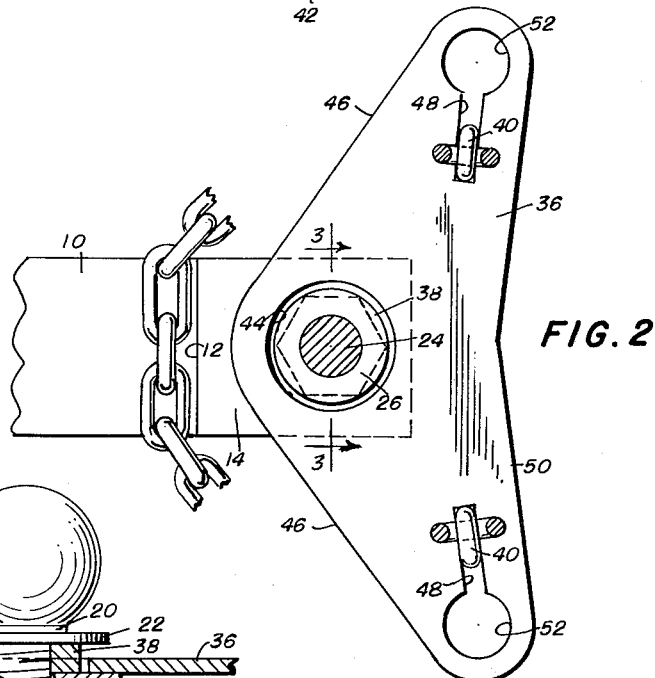
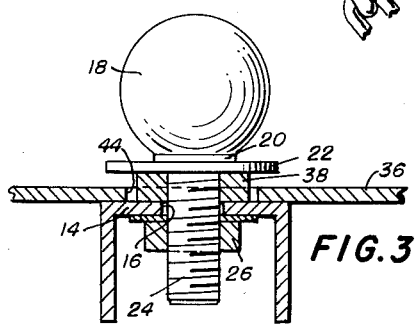
INVENTOR
CLARENCE A. BRAZIL
BY Raymond N. Matson
ATTORNEY

United States Patent Office 2,998,982
Patented Sept. 5, 1961

2,998,982
TRAILER HITCH SAFETY DEVICE
Clarence A. Brazil, 712 W. Jefferson, Pittsburg, Kans.
Filed May 31, 1960, Ser. No. 32,850
2 Claims. (Cl. 280—457)

This invention relates generally to trailer hitches and more particularly to a safety device for preventing the accidental uncoupling thereof.

Hitches of various types for coupling vehicles and trailers together are well known in the art and all are subject to accidental uncoupling through loosening of the securing means due to vibration, etc., and through failure of one or more of the hitch elements.

Various safety devices for preventing such accidental uncoupling of trailer hitches are also known in the art and as a whole, these are characterized by certain inherent disadvantageous features. Among these are an impractical construction rendering their installation difficult on a specified type of hitch and impossible on other hitches of different types or sizes; a poor design which unnecessarily limits relative turning movement between the vehicle and trailer; inadequate structural strength so as to be susceptible of failure and of dubious value as a safety device; and of high cost.

Accordingly, the main object of the present invention is to provide an improved trailer hitch safety device which will obviate the above and other objectionable features characterizing known safety devices.

An important object of the present invention is to provide an improved trailer hitch safety device which will positively prevent the accidental uncoupling of a trailer from the towing vehicle.

Another important object of the present invention is to provide an improved trailer hitch safety device which can be readily applied to hitches of various types and sizes.

A further important object of the present invention is to provide an improved trailer hitch safety device which will prevent uncoupling due to loosening of the elements of a hitch or to their failure.

A still further important object of the invention is to provide an improved trailer hitch safety device which permits relative turning movement and hinge action between the towing vehicle and the trailer, is simple in construction and susceptible of ready and economic manufacture, and is rugged and of long life in use.

Other objects and advantages of the present invention will become apparent during the course of the following description.

In the drawings I have shown one embodiment of the invention. In this showing:

FIGURE 1 is a side elevational view showing the safety device in operative position on a coupled trailer hitch;

FIGURE 2 is a top plan view thereof taken on the line 2—2 of FIGURE 1; and

FIGURE 3 is a vertical sectional view taken on the line 3—3 of FIGURE 2.

While the trailer hitch safety device comprising the present invention is adaptable for use with different types of hitches, for purposes of illustration, it is shown as applied to a hitch of the ball and socket type.

Referring to the drawings, numeral 10 designates a tow bar of channel form which is attached to a vehicle and has an upstanding portion 12 terminating in a horizontal, rearwardly extending bracket 14 having a bolt-receiving aperture 16. A ball 18 including a spacing neck portion 20 and bearing collar 22 terminates in a lower threaded bolt 24 which is mounted in the aperture 16 and retained on the bracket 14 by means of a lock washer and nut 26.

The ball 18 is received in a socket 28 of a housing 30 which is rigidly connected to the tongue 32 of a trailer. The ball 18 is retained in the socket 28 by conventional locking mechanism 34 mounted on and in the housing 30. The structure thus far described is one form of a conventional ball and socket type trailer hitch.

The safety device comprising the present invention which co-operates with the trailer hitch structure described, comprises a locking plate 36, a bushing 38, and a chain 40 including a clevis link 42. The plate 36 is generally triangular in shape and includes a large aperture 44 adjacent its forward portion and the rounded intersection of two of its sides 46 which extend rearwardly at an angle of about 45°, the included angle of about 90° enabling adequate relative rotation between the vehicle and the trailer as will appear.

A pair of spaced slots 48 are also formed in the plate 36 adjacent its third side 50 and each opens into an aperture 52 formed in a rear corner of the plate. The slots 48 have a width slightly greater than the thickness of a link of the chain 40 and the apertures 52 have a diameter slightly greater than the width of a chain link for purposes which will become apparent. The bushing 38 has an outside diameter which is less than the diameter of the aperture 44, so as to be freely rotatable therein and also has a height greater than the thickness of the plate 36.

The safety device is readily installed on the trailer hitch by inserting the bushing 38 within the aperture 44 and inserting the bolt 24 therethrough on the tow bar bracket 14 so that the bushing is clamped between it and the ball collar 22. The plate 36 is thus free to pivot about the bushing as relative movement occurs between the vehicle and the trailer when coupled.

The trailer is now connected to the vehicle in the regular manner and the chain 40 is looped over the socket housing 30 (FIGURE 1). The ends of the chain are passed through the apertures 52 and when pulled tight, links of the chain slipped into the slots 48 (FIGURE 2) so that the adjoining links below the plate 36 bear against the edges of the slots to afford a positive lock and maintain the chain 40 tightly against the socket housing 30. After the chain 40 is locked in the rotatable plate 36, an end is passed around the portion 12 of the tow bar 10 and back to the other chain end to which it is secured by the clevis link 42.

Thus, double protection is afforded against the trailer coming uncoupled from the vehicle. The chain about the housing prevents relative vertical movement between it and the ball if the locking mechanism 34 should fail or become inoperative for any reason to ensure continued coupling. The chain around the tow bar portion 12 also acts as a safety and draft chain if the nut 26 should become loose or lost.

It will now be readily apparent that the plate 36 and bushing 38 ensure a free universal pivotal movement in all directions as well as a hinge action, which being minor, is accommodated by the chain adjustment. The present invention co-operates with standard hitches and so eliminates the need for special ones at increased costs, and installation is readily accomplished so as to be permanent with the use of an ordinary wrench.

It is to be understood that the form of the invention herewith shown and described is to be taken as a preferred example of the same and that various changes in the shape, size and arrangement of parts may be resorted to without departure from the spirit of the invention or the scope of the subjoined claims.

I claim:

1. A safety device for a trailer hitch including mating, relatively rotatable tow bar and draft elements and locking mechanism for maintaining the hitch in coupled relationship, comprising a plate rotatably mounted on the tow bar element and concentrically with its mating element, a pair of slots formed in said plate at points spaced transversely of the hitch, and a chain tightly surrounding the mating element of the draft elements and having links engaged in said slots to prevent relative vertical movement between the elements.

2. A device as recited in claim 1 wherein said chain also encircles the tow bar element so as to serve as draft means upon accidental uncoupling of the hitch.

References Cited in the file of this patent

UNITED STATES PATENTS

| | | |
|---|---|---|
| 2,815,225 | Barcafer | Dec. 3, 1957 |
| 2,937,885 | Skow | May 24, 1960 |